US012578058B2

(12) United States Patent
Baik et al.

(10) Patent No.: US 12,578,058 B2
(45) Date of Patent: Mar. 17, 2026

(54) LIQUID HYDROGEN FUEL TANK AND LIQUID HYDROGEN STORAGE DEVICE INCLUDING SAME

(71) Applicant: H2CREO Corp., Dover, DE (US)

(72) Inventors: Jong H Baik, Titusville, FL (US); Jeong Hyun Im, Yeongwol-gun (KR); Hyung Jin Kim, Yongin-si (KR); Sung Yong Kim, Yongin-si (KR)

(73) Assignee: H2CREO Corp., Dover, DE (US)

( * ) Notice: Subject to any disclaimer, the term of this patent is extended or adjusted under 35 U.S.C. 154(b) by 298 days.

(21) Appl. No.: 18/354,386

(22) Filed: Jul. 18, 2023

(65) Prior Publication Data

US 2024/0175547 A1 May 30, 2024

Related U.S. Application Data

(60) Provisional application No. 63/384,977, filed on Nov. 25, 2022.

(51) Int. Cl.
*F17C 5/00* (2006.01)
*F17C 7/04* (2006.01)

(52) U.S. Cl.
CPC ........ *F17C 7/04* (2013.01); *F17C 2201/0109* (2013.01); *F17C 2203/012* (2013.01); *F17C 2203/015* (2013.01); *F17C 2203/0391* (2013.01); *F17C 2203/0629* (2013.01); *F17C 2205/0332* (2013.01); *F17C 2205/0335* (2013.01); *F17C 2205/0364* (2013.01);
(Continued)

(58) Field of Classification Search
CPC .. F17C 5/02; F17C 2205/03; F17C 2205/037; F16L 59/141
See application file for complete search history.

(56) References Cited

U.S. PATENT DOCUMENTS 3,696,636 A * 10/1972 Mille ...................... F28D 7/106 62/51.1
2004/0251007 A1* 12/2004 Toh ........................... F17C 1/00 165/157

(Continued)

FOREIGN PATENT DOCUMENTS

JP 2014074452 A 4/2014
KR 20200056668 A 5/2020

(Continued)

*Primary Examiner* — Brian M King
(74) *Attorney, Agent, or Firm* — McDonnell Boehnen Hulbert & Berghoff LLP

(57) ABSTRACT

A liquid hydrogen fuel tank including a container is disclosed. The container includes an outer tank and an inner tank; a gaseous hydrogen discharge pipe configured to allow gaseous hydrogen to flow therein; a liquid hydrogen supply pipe, of which a portion is located inside the gaseous hydrogen discharge pipe; a discharge connection pipe, of which one end is connected to the gaseous hydrogen discharge port of the inner tank and the other end is connected to the gaseous hydrogen discharge pipe; and an injection connection pipe, of which one end is connected to the liquid hydrogen supply port and the other end is connected to the liquid hydrogen supply pipe; wherein the gaseous hydrogen discharge pipe includes at least one gas discharge port configured for a connector of an external gas moving pipe to be inserted thereinto.

6 Claims, 20 Drawing Sheets

(52) U.S. Cl.
CPC *F17C 2221/012* (2013.01); *F17C 2227/0302* (2013.01); *F17C 2250/0439* (2013.01); *F17C 2250/0491* (2013.01); *F17C 2260/011* (2013.01); *F17C 2270/0184* (2013.01)

(56) References Cited

U.S. PATENT DOCUMENTS

| | | | | |
|---|---|---|---|---|
| 2015/0033674 | A1* | 2/2015 | Downie | F17C 5/06<br>141/59 |
| 2020/0318792 | A1* | 10/2020 | Song | F17C 3/085 |
| 2021/0080156 | A1* | 3/2021 | Kim | F17C 3/04 |
| 2022/0042649 | A1* | 2/2022 | Pennec | F17C 5/02 |
| 2022/0349526 | A1* | 11/2022 | Kubica | F17C 3/08 |
| 2023/0098469 | A1* | 3/2023 | Bonnissel | F17C 13/026<br>141/4 |
| 2023/0375138 | A1* | 11/2023 | Wang | B01D 53/04 |
| 2024/0102614 | A1* | 3/2024 | Sakaguchi | F17C 13/008 |
| 2024/0110671 | A1* | 4/2024 | Dimmer | F16L 59/141 |
| 2024/0392927 | A1* | 11/2024 | Zieger | F17C 13/04 |

FOREIGN PATENT DOCUMENTS

| | | | |
|---|---|---|---|
| KR | 20200114383 | A | 10/2020 |
| KR | 20200145244 | A | 12/2020 |
| KR | 102328719 | B1 | 11/2021 |
| KR | 20210139469 | A | 11/2021 |

* cited by examiner

LIQUID HYDROGEN FUEL TANK AND LIQUID HYDROGEN STORAGE DEVICE INCLUDING SAME

FIELD OF THE INVENTION

The present disclosure relates to a liquid hydrogen fuel tank and a liquid hydrogen storage device including the same, specifically to a liquid hydrogen fuel tank and a liquid hydrogen storage device including the same, which are lightweight, have superior durability, and simplify a liquid hydrogen injection process when compared to the prior art.

BACKGROUND OF THE INVENTION

As a way to solve problems of air pollution and global warming caused by excessive use of fossil fuels, research on use of non-hydrocarbon fuels has been actively conducted domestically and abroad. Among various methods proposed to solve such problems, a most efficient and representative method is use of hydrogen energy.

Conventional technology has two main problems. One is related to a method of storing gas and the other is a problem that occurs when storing liquid. In case of storing gas, volume is very large so that a large storage space is required, resulting in low storage efficiency. In order to overcome this low storage efficiency, compression is performed at very high pressure. In this case, a storage container that can withstand high pressure should be used. To withstand pressure, a high-pressure gas storage container cannot have a volume greater than a certain capacity. Accordingly, a number of high-pressure gas storage containers are required to store a large amount of high-pressure gas, and the number of storage containers lowers the storage efficiency of hydrogen.

As another method of storing hydrogen, there is a method of storing liquid hydrogen. Since liquid hydrogen exists at very low temperatures, insulation is required to reduce heat loss at room temperature. Paths through which heat penetrates at room temperature include conduction, radiation, and convection. In order to minimize conduction, an appropriate insulation structure design is required. For example, in order to minimize radiation, a multilayer insulation shielding film can be used. For minimizing convection, vacuum insulation for removing gas that is a heat transfer medium, for example, can be applied. Conventional liquid hydrogen storage containers can store cryogenic liquid hydrogen by applying such insulation technology.

However, conventional aviation storage containers configured to be mounted in an aircraft are greatly limited in weight that can be accommodated, and thus weight reduction is greatly required for such liquid hydrogen storage devices. Moreover, a structure of a liquid hydrogen injection port and a gaseous hydrogen discharge port of a conventional liquid hydrogen fuel tank has a problem in that operation of connecting a charging nozzle to each of the liquid hydrogen injection port and the gaseous hydrogen discharge port of the liquid hydrogen fuel tank, which is required to supply fuel to a fuel cell in a narrow space in an aircraft, is complicated and difficult.

Meanwhile, FIG. 1 is a drawing schematically illustrating an appearance of a conventional liquid hydrogen fuel tank 10.

The conventional liquid hydrogen fuel tank 10 is equipped with an outer tank 11, an inner tank 12, a gaseous hydrogen discharge pipe 13, and a liquid hydrogen supply pipe 14. The outer tank 11 is configured to accommodate the inner tank 12. The gaseous hydrogen discharge pipe 13 and the liquid hydrogen supply pipe 14 are inserted into through-holes of each of the outer tank 11 and the inner tank 12. The inner tank 12 is configured to contain liquid hydrogen. Some of the liquid hydrogen contained in the inner tank 12 is evaporated by heat generated by a heater 19 and hydrogen gas is produced, and the hydrogen gas produced in this way can be discharged to outside through the gaseous hydrogen discharge pipe 13. In addition, in order to inject liquid hydrogen into the inner tank 12, liquid hydrogen flows into a receiving space of the inner tank 12 through the liquid hydrogen supply pipe 14 and is stored therein.

However, the conventional liquid hydrogen fuel tank 10 needs to be equipped with opening/closing valves 15, 16 in each of the liquid hydrogen supply pipe 14 and the gaseous hydrogen discharge pipe 13 to inject liquid hydrogen and store liquid hydrogen after injecting liquid hydrogen, or to control discharge of gaseous hydrogen, as necessary. Due to this structure, the conventional liquid hydrogen fuel tank 10 has been very cumbersome because it is necessary for workers to manually open the opening/closing valves 15, 16 provided in each of the liquid hydrogen supply pipe 14 and the gaseous hydrogen discharge pipe 13 before inserting a charging nozzle (not shown) of an external hydrogen injection device into the liquid hydrogen supply pipe 14.

Moreover, the conventional liquid hydrogen fuel tank 10 includes a structure in which each of the gaseous hydrogen discharge pipe 13 and the liquid hydrogen supply pipe 14 penetrates the outer tank 11 and the inner tank 12, respectively. Due to this structure, in the conventional liquid hydrogen fuel tank 10, a possibility that an airtight state of a container is damaged is increased through the through-holes formed in the outer tank 11 and the inner tank 12, respectively.

Furthermore, the conventional liquid hydrogen fuel tank 10 is equipped with a liquid hydrogen supply pipe 14 for injecting liquid hydrogen, a gaseous hydrogen discharge pipe 13 for discharging hydrogen gas, and safety valves 17, 18 provided in each of the liquid hydrogen supply pipe 14 and the gaseous hydrogen discharge pipe 13 to safely maintain internal pressure. However, the conventional liquid hydrogen fuel tank 10 has a disadvantage of increasing facility cost in case that the safety valves 17, 18 are provided in the liquid hydrogen supply pipe 14 and the gaseous hydrogen discharge pipe 13, respectively.

PRIOR DISCLOSURE(S)

Korean Patent Application Publication No. 2020-0145244

SUMMARY OF THE INVENTION

An object of the present disclosure is to provide a liquid hydrogen fuel tank and a liquid hydrogen storage device including the same, which are lightweight, have superior durability, and simplify a liquid hydrogen injection process when compared to the prior art, by increasing tank strength against pressure. Specifically, according to the present disclosure, it is possible to enable an external liquid hydrogen injection device to inject liquid hydrogen by connecting a gaseous hydrogen discharge pipe and a liquid hydrogen supply pipe together without separately operating an opening/closing valve, thereby providing a new method for solving a problem that requires simplification of liquid hydrogen injection processes.

According to one aspect of the present disclosure, a liquid hydrogen fuel tank is provided. The liquid hydrogen fuel tank may comprise: a container including an outer tank having a pipe insertion port into which a pipe is inserted, and an inner tank located inside the outer tank, having a liquid hydrogen supply port into which liquid hydrogen is injected, having a gaseous hydrogen discharge port configured to discharge gaseous hydrogen to outside, and having a storage space for storing liquid hydrogen; a gaseous hydrogen discharge pipe configured to allow gaseous hydrogen to flow therein, having an elongated shape to be inserted into the pipe insertion port from inside of the outer tank, and configured to discharge gaseous hydrogen generated in the storage space of the inner tank to outside; a liquid hydrogen supply pipe, of which a portion is located inside the gaseous hydrogen discharge pipe, having an elongated shape to be inserted into the pipe insertion port from inside of the outer tank, and having an outer injection port configured to be connected to an external charging nozzle for injecting liquid hydrogen; a discharge connection pipe, of which one end is connected to the gaseous hydrogen discharge port of the inner tank and the other end is connected to the gaseous hydrogen discharge pipe; and an injection connection pipe, of which one end is connected to the liquid hydrogen supply port and the other end is connected to the liquid hydrogen supply pipe; wherein the gaseous hydrogen discharge pipe includes at least one gas discharge port configured for a connector of an external gas moving pipe to be inserted thereinto when the external charging nozzle is inserted into the outer injection port of the liquid hydrogen supply pipe.

In an embodiment, the gaseous hydrogen discharge pipe may have a same pipe center as the liquid hydrogen supply pipe.

In an embodiment, the liquid hydrogen fuel tank may further comprise a first check valve configured for a part of the external charging nozzle to be inserted thereinto, provided in the liquid hydrogen supply pipe, and configured to prevent liquid hydrogen from backflowing from the inner tank toward the outer injection port when separating the charging nozzle from the outer injection port; and a second check valve configured for the connector of the external gas moving pipe to be inserted thereinto, provided in the gaseous hydrogen discharge pipe, and configured to prevent gaseous hydrogen from backflowing from the inner tank toward the gas discharge port when separating the connector from the gas discharge port.

In an embodiment, the liquid hydrogen fuel tank may further comprise temperature sensors positioned at an upper position of the inner tank, a middle position of the inner tank, and a lower position of the inner tank, respectively, to measure temperatures.

In an embodiment, the liquid hydrogen fuel tank may further comprise a safety valve provided in the gaseous hydrogen discharge pipe.

In an embodiment, the liquid hydrogen fuel tank may further comprise a pair of supports configured for one end and the other end of the supports to be connected to the outer tank, respectively, and at least one side of the supports is connected to the inner tank.

In an embodiment, the liquid hydrogen fuel tank of the present disclosure may further comprise a first reinforcing ring having an elongated shape along an inner surface of the outer tank and having one end configured to be supported by the inner surface of the outer tank; and a second reinforcing ring having an elongated shape along an outer surface of the inner tank and having one end configured to be supported by the outer surface of the inner tank.

In an embodiment, the liquid hydrogen fuel tank of the present disclosure may further comprise at least one baffle having an elongated shape in a vertical direction and having an upper end and a lower end respectively supporting each of a ceiling surface and a bottom surface inside the inner tank.

In an embodiment, a space between the outer tank and the inner tank may be in a vacuum state, or an insulating medium is included in the space between the outer tank and the inner tank.

In an embodiment, the injection connection pipe may spirally extend along the outer surface of the inner tank from the liquid hydrogen supply port of the inner tank to the liquid hydrogen supply pipe.

According to another aspect of the present disclosure, a liquid hydrogen storage device comprising any one of the above liquid hydrogen fuel tanks. The liquid hydrogen storage device may comprise: a gas generating heater configured to heat the liquid hydrogen fuel tank to evaporate liquid hydrogen inside the liquid hydrogen fuel tank; and a heat exchange pipe connected to the liquid hydrogen fuel tank and configured to raise temperature of hydrogen gas generated by evaporation of liquid hydrogen for fuel supply.

Conventional fuel tanks for high-pressure gas are made by impregnating into laminated carbon fibers or thick carbon steel with adhesives, they are thick and heavy, and hydrogen storage capacity is also limited. On the other hand, since the present disclosure stores liquid hydrogen at normal pressure without storing high-pressure gas, a thick structure to withstand high pressure is not required, so a fuel tank can be provided with a relatively light structure. Therefore, the liquid hydrogen fuel tank according to an embodiment of the present disclosure is lighter in weight than a conventional fuel tank for high-pressure gas for storing high-pressure gaseous hydrogen.

In the liquid hydrogen fuel tank according to an embodiment of the present disclosure, a liquid hydrogen supply pipe for injecting cryogenic liquid hydrogen is located inside a gaseous hydrogen discharge pipe, injection of liquid hydrogen and discharge of gaseous hydrogen are performed from each end portion of the liquid hydrogen supply pipe and the gaseous hydrogen discharge pipe, and at least one gas discharge port is provided in the gas hydrogen discharge pipe so that an external charging nozzle is inserted into an outer injection port of the liquid hydrogen supply pipe and a connector of an external gas moving pipe configured to move gas is inserted, thereby having an advantage of easy injection of liquid hydrogen and discharge of evaporated gas.

Moreover, the liquid hydrogen fuel tank of the present disclosure has a structure in which each of the liquid hydrogen supply pipe and the gaseous hydrogen discharge pipe is inserted into one pipe insertion port of the outer tank, thereby reducing a number of insertion ports through which pipes are inserted into the outer tank. Therefore, it is possible to reduce manufacturing cost of the tank by reducing a phenomenon in which an airtight state of the tank is destroyed through pipe insertion holes and simplifying a structure of the liquid hydrogen fuel tank.

Furthermore, the liquid hydrogen fuel tank of the present disclosure includes a first reinforcing ring and a second reinforcing ring, and by the first reinforcing ring and the second reinforcing ring, it prevents the inner tank from being expanded under internal pressure and prevents the outer tank from being contracted under external pressure. Accordingly, the liquid hydrogen fuel tank of the present disclosure can maintain strength against internal and external pressure of the inner tank and the outer tank through the first reinforcement ring and the second reinforcement ring, and overall thickness of the inner tank and the outer tank can be designed to be thin, thereby reducing weight of the liquid hydrogen fuel tank.

DESCRIPTION OF THE INVENTION

Advantages and features, and a method of achieving the same of the present disclosure will be apparent with reference to the embodiments described below in detail together with the accompanying drawings. However, the present disclosure is not limited to the embodiments disclosed below, but will be implemented in various forms, which are provided to ensure that the present disclosure is complete and to fully inform the scope of the invention to those skilled in the art to which the present disclosure pertains, and the present disclosure will be only defined by the scope of the claims.

The terms used in the present specification are used only to describe specific embodiments and are not used in the intention of limiting the present disclosure. For example, a component represented by a singular number should be understood as a concept containing multiple components unless the context explicitly means only a singular number. Also, in the specification of the present disclosure, terms such as 'include' or 'have' are intended to designate that there is a feature, number, step, operation, component, part, or combination thereof described in the specification, but the use of these terms does not exclude the possibility of the presence or addition of one or more other features, numbers, steps, operations, components, parts, or combinations thereof.

In addition, all terms used herein including technical or scientific terms, unless otherwise defined, have the same meaning as those generally understood by those skilled in the art to which the present disclosure pertains.

Terms such as those defined in commonly used dictionaries should be interpreted as having a meaning consistent with the context of the relevant technology and are not interpreted as ideal or excessively formal unless explicitly defined in the specification of the present disclosure.

Hereinafter, embodiments of the present disclosure will be described in more detail with reference to the accompanying drawings. However, in the following description, if there is a concern that the gist of the present disclosure is unnecessarily blurred, a detailed description related to the widely known functions or configurations will be omitted.

Figure 1:
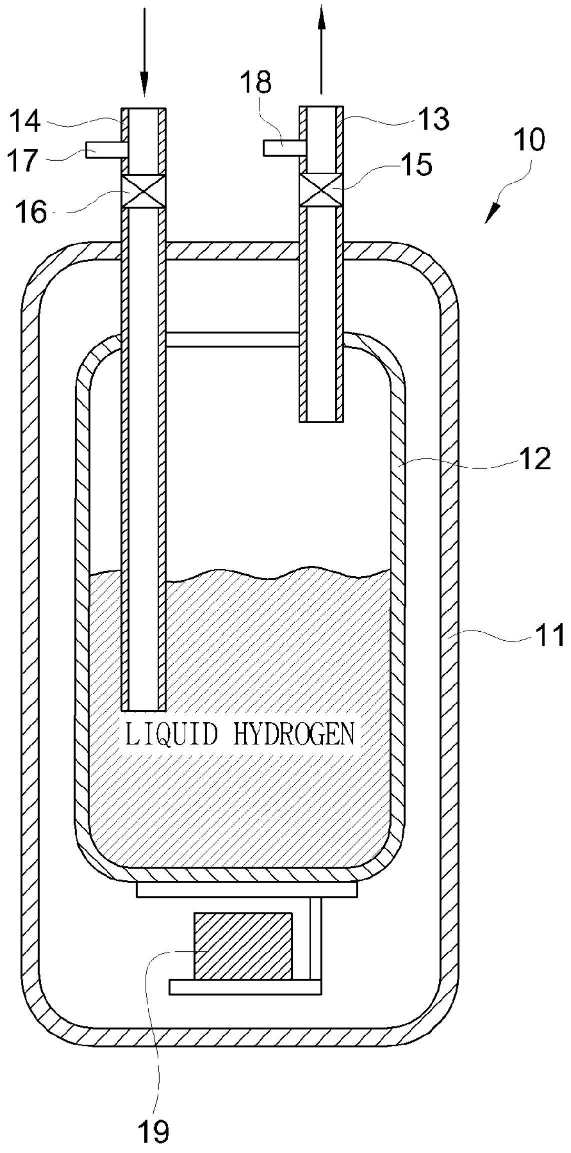
FIG. 1 (PRIOR ART)
FIG. 1 is a diagram schematically illustrating a conventional liquid hydrogen fuel tank.
Figure 2:
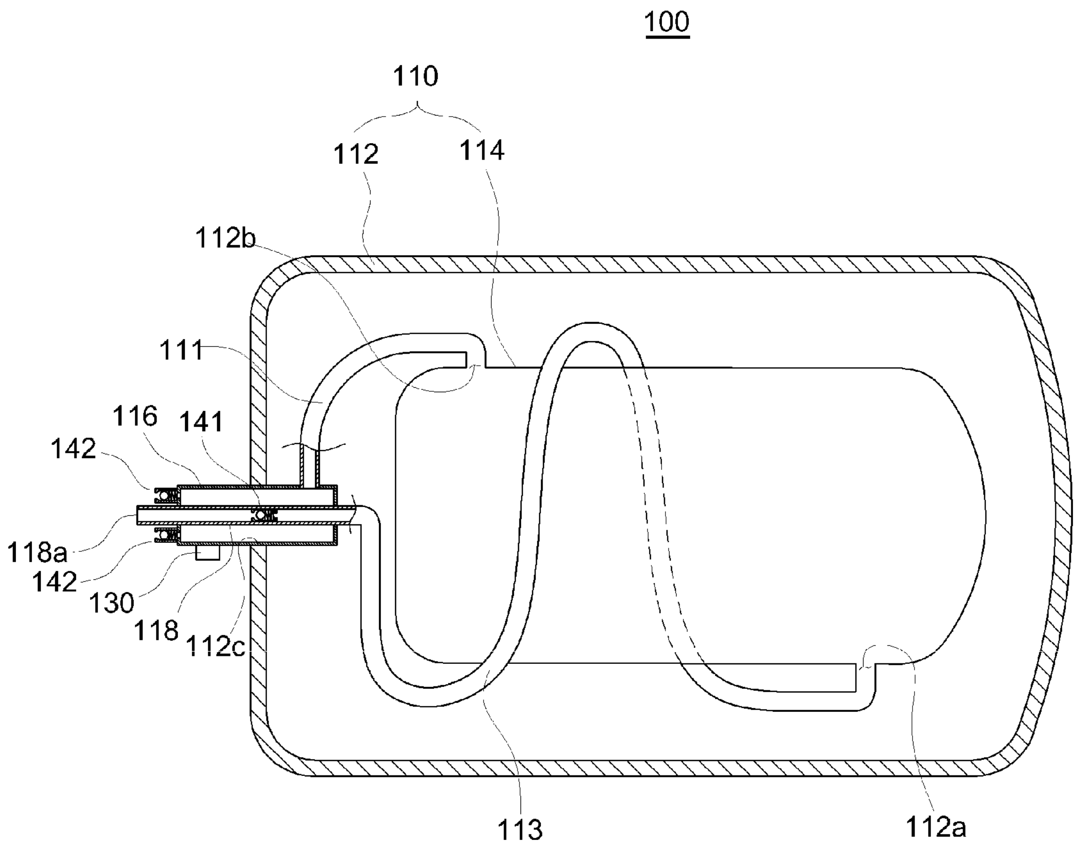
FIG. 2 is a vertical cross-sectional view illustrating an inside of a liquid hydrogen fuel tank according to an embodiment of the present disclosure.

FIG. 2 is a vertical cross-sectional view illustrating an inside of a liquid hydrogen fuel tank 100 according to an embodiment of the present disclosure.

Referring to FIG. 2, the liquid hydrogen fuel tank 100 of the present disclosure includes a container 110 including an outer tank 112 and an inner tank 114, a gaseous hydrogen discharge pipe 116, a liquid hydrogen supply pipe 118, a discharge connection pipe 111, and an injection connection pipe 113.

Specifically, a pipe insertion port 112*c* into which the gas discharge pipe 116 is inserted is formed in the outer tank 112. The inner tank 114 is located inside the outer tank 112, and a liquid hydrogen supply port 112*a* into which liquid hydrogen is injected is formed in the inner tank 114. A gaseous hydrogen discharge port 112*b* configured to discharge internal gaseous hydrogen to outside is formed in the inner tank 114. A storage space for storing liquid hydrogen is formed in the inner tank 114. For example, each of the outer tank 112 and the inner tank 114 may have an oval appearance that is longer in the horizontal direction than in the vertical direction.

The gaseous hydrogen discharge pipe 116 may be configured to allow gaseous hydrogen to flow therein. The gaseous hydrogen discharge pipe 116 has an elongated shape to be inserted into the pipe insertion port 112*c* from inside of the outer tank 112. One end portion of the gaseous hydrogen discharge pipe 116 is exposed to outside of the outer tank 112. The gaseous hydrogen discharge pipe 116 is configured to discharge the gaseous hydrogen of the inner tank 114 to outside.

A portion of the liquid hydrogen supply pipe 118 is located inside the gaseous hydrogen discharge pipe 116. The liquid hydrogen supply pipe 118 has an elongated shape to be inserted into the pipe insertion port 112*c*. An outer injection port 118*a* configured to be connectable to a charging nozzle 21 (see FIGS. 3 and 4) of an external injection pipe 20 (see FIGS. 3 and 4) for injecting liquid hydrogen is formed in the liquid hydrogen supply pipe 118.

One end of the discharge connection pipe 111 is connected to the gaseous hydrogen discharge port 112*b* of the inner tank 114, and the other end of the discharge connection pipe 111 is connected to the gaseous hydrogen discharge pipe 116.

One end of the injection connection pipe 113 is connected to the liquid hydrogen supply port 112*a*, and the other end of the injection connection pipe 113 is connected to the liquid hydrogen supply pipe 118.

Figure 3:
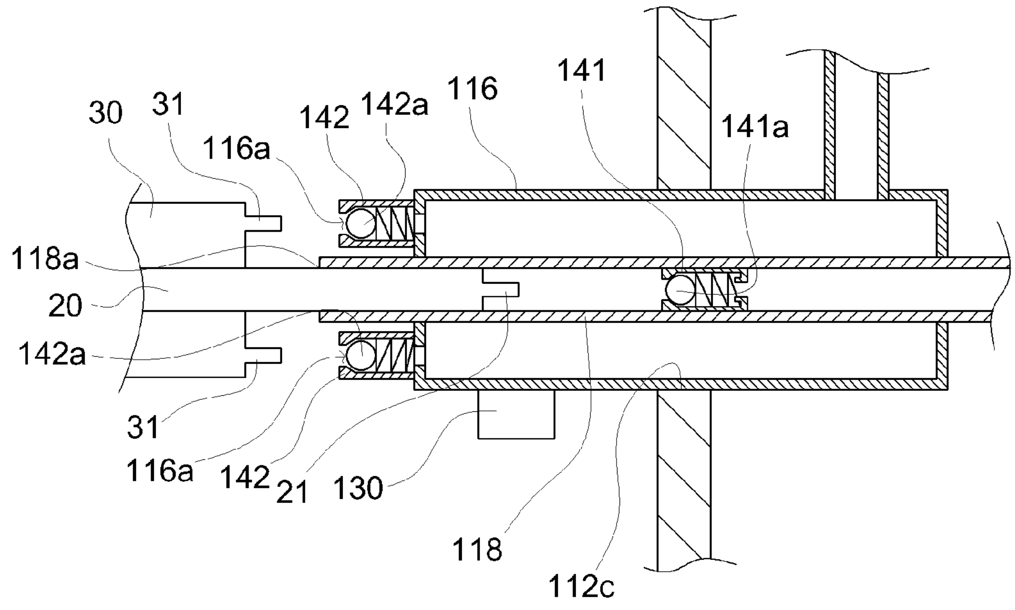
FIG. 3 and FIG. 4 are partial cross-sectional views illustrating a liquid hydrogen supply pipe and a gaseous hydrogen discharge pipe of a liquid hydrogen fuel tank according to an embodiment of the present disclosure.
Figure 4:
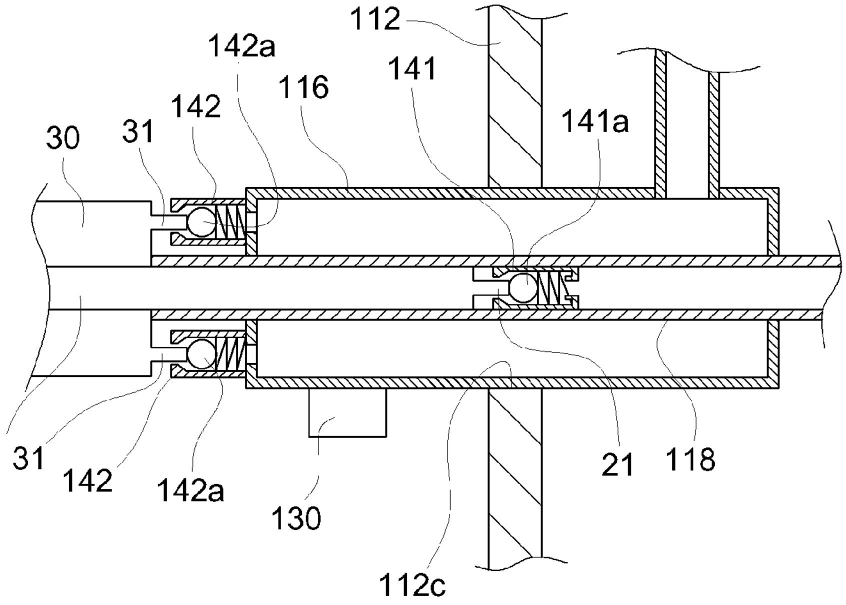

FIG. 3 and FIG. 4 are partial cross-sectional views illustrating end portions of a liquid hydrogen supply pipe 118 and a gaseous hydrogen discharge pipe 116 of a liquid hydrogen fuel tank 100 according to an embodiment of the present disclosure.

Referring to FIG. 3 and FIG. 4 along with FIG. 2, the liquid hydrogen fuel tank 100 of the present disclosure is configured for liquid hydrogen injected from the charging nozzle 21 of the external injection pipe 20 to the outer injection port 118*a* to flow along inside of the liquid hydrogen supply pipe 118; and hydrogen gas discharged from the inner tank 114 moves along the discharge connection pipe 111, flows into one end of the gaseous hydrogen discharge pipe 116, and then flows to the other end of the gaseous hydrogen discharge pipe 116. That is, the gaseous hydrogen discharge pipe 116 of the liquid hydrogen fuel tank 100 of the present disclosure is configured for gaseous hydrogen to be discharged to outside through a space between an outer surface outside the liquid hydrogen supply pipe 118 and an inner surface inside the gaseous hydrogen discharge pipe 116 at the same time as liquid hydrogen injected from the charging nozzle 21 flows into the inner tank 114 through the liquid hydrogen supply pipe 118.

In addition, the gaseous hydrogen discharge pipe 116 may have at least one gas discharge port 116*a* configured for a connector 31 of an external gas moving pipe 30 to be inserted thereinto when the charging nozzle 21 of an external charging device (not shown) is inserted into the outer injection port 118*a* of the liquid hydrogen supply pipe 118. The external gas moving pipe 30 is configured to allow gaseous hydrogen of the inner tank 114 to move to outside. For example, the gas discharge port 116*a* may be an inlet of a second check valve 142 provided in the gaseous hydrogen discharge pipe 116.

Accordingly, in the liquid hydrogen fuel tank 100 according to the present disclosure, the liquid hydrogen supply pipe 118 for injecting cryogenic liquid hydrogen is located inside the gaseous hydrogen discharge pipe 116, and injection of liquid hydrogen and discharge of gaseous hydrogen are performed from the end portions of the liquid hydrogen supply pipe 118 and the gaseous hydrogen discharge pipe 116, respectively, which enables the connector 31 and the charging nozzle 21 of the external liquid hydrogen injection device (not shown) to be connected to the liquid hydrogen supply pipe 118 and the gas hydrogen discharge pipe 116 at once, respectively, thereby having an advantage in that an operation of injecting liquid hydrogen and an operation of discharging evaporated gaseous hydrogen are easy.

In addition, the liquid hydrogen fuel tank 100 of the present disclosure has a structure in which each of the liquid hydrogen supply pipe 118 and the gaseous hydrogen discharge pipe 116 is inserted into one pipe insertion port 112*c* of the outer tank 112, thereby reducing a number of insertion ports for insertion of pipes in the outer tank 112. This reduces destruction of a tank's airtight state, which is likely to occur in the pipe insertion port 112*c* and simplifies the structure of the liquid hydrogen fuel tank 100, thereby reducing the manufacturing cost of a tank.

Moreover, since evaporated gas flowing in the gas discharge pipe 116 lowers temperature of the liquid hydrogen supply pipe 118, the liquid hydrogen fuel tank 100 of the present disclosure can effectively reduce evaporation of liquid hydrogen that may occur while liquid hydrogen passes through the liquid hydrogen supply pipe 118.

Figure 5:
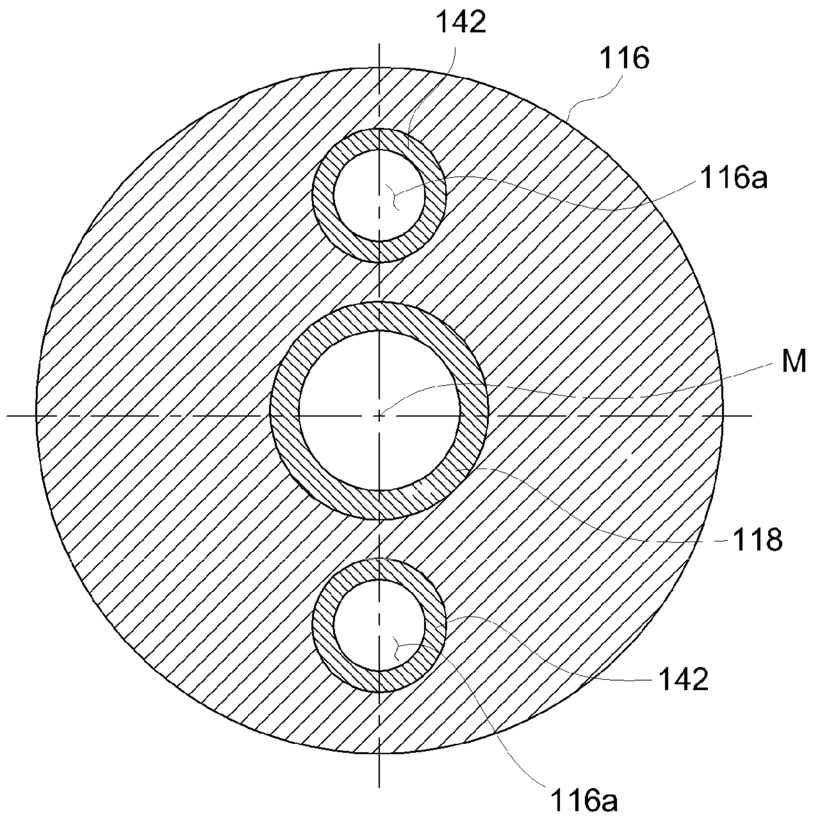
FIG. 5 is a side view illustrating end portions of a liquid hydrogen supply pipe and a gaseous hydrogen discharge pipe of a liquid hydrogen fuel tank according to an embodiment of the present disclosure.
Figure 6:
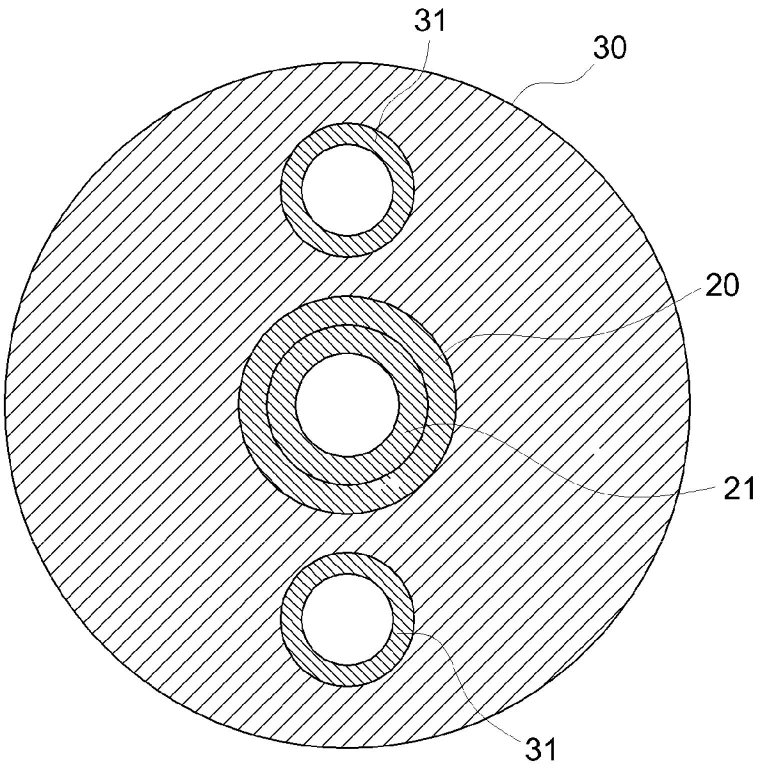
FIG. 6 is a partial cross-sectional view illustrating a part of an external liquid hydrogen injection device of a liquid hydrogen fuel tank according to an embodiment of the present disclosure.

FIG. 5 is a side view illustrating end portions of a liquid hydrogen supply pipe 118 and a gaseous hydrogen discharge pipe 116 of a liquid hydrogen fuel tank 100 according to an embodiment of the present disclosure. FIG. 6 is a partial cross-sectional view illustrating a part of an external liquid hydrogen injection device of a liquid hydrogen fuel tank 100 according to an embodiment of the present disclosure.

Referring to FIG. 3 to FIG. 6, the gaseous hydrogen discharge pipe 116 may have a same pipe center M as an outer injection port 118*a* of the liquid hydrogen supply pipe 118. Accordingly, when the charging nozzle 21 of the external liquid injection pipe 20 is inserted into the outer injection port 118*a* aligned with the pipe center of the liquid hydrogen supply pipe 118, the connector 31 of the external gas moving pipe 30 can be precisely inserted into the gas discharge port 116*a* so that hydrogen gas is discharged to outside. Although FIG. 6 illustrates that two connectors 31 are formed in a gas moving pipe 30, a number of connectors 31 is not necessarily limited to two, and three or more connectors 31 may be provided.

Accordingly, the liquid hydrogen fuel tank 100 of the present disclosure includes the gaseous hydrogen discharge pipe 116 having a same pipe center M as the outer injection port 118*a*, thereby making it easy to adjust a position for inserting the charging nozzle 21 of the external liquid hydrogen injection device into the outer injection port 118*a* of the liquid hydrogen supply pipe 118, and easy for the connector 31 of the external gas moving pipe 30 to be connected to the gas discharge port 116*a* precisely at the same time as the charging nozzle 21 is inserted into the outer injection port 118*a*. Therefore, the present disclosure can prevent liquid hydrogen or gaseous hydrogen from being unintentionally lost to outside while liquid hydrogen is injected.

Figure 7:
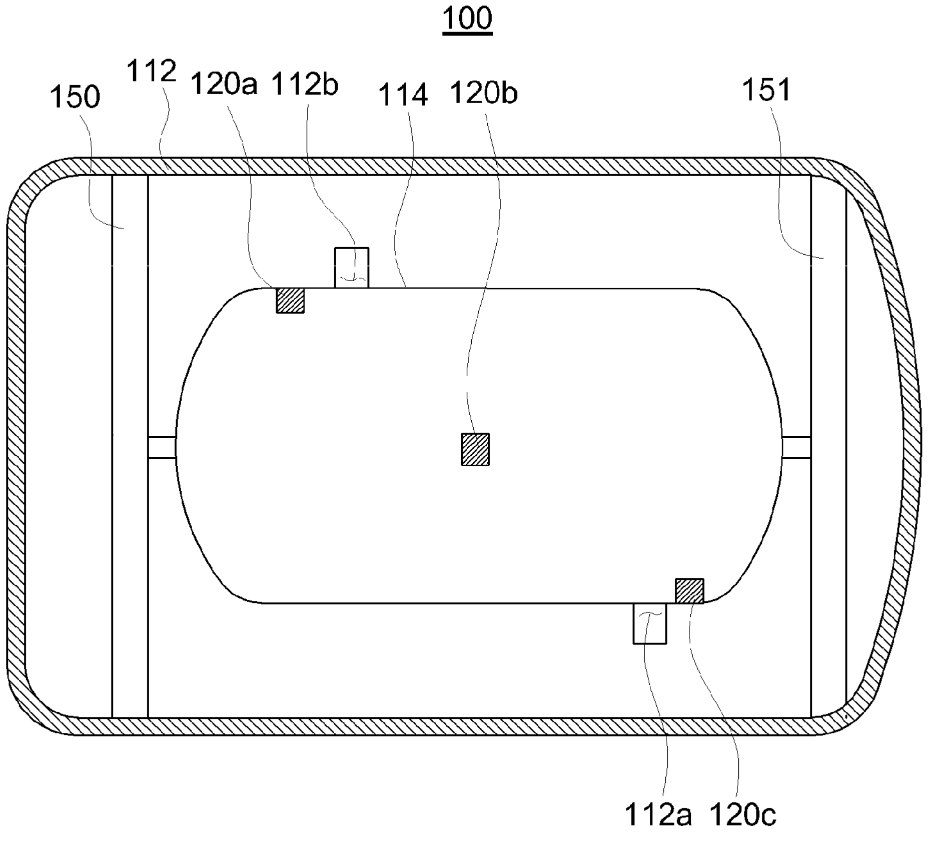
FIG. 7 is a vertical cross-sectional view illustrating an inside of a liquid hydrogen fuel tank according to an embodiment of the present disclosure.

FIG. 7 is a vertical cross-sectional view illustrating an inside of a liquid hydrogen fuel tank 100 according to an embodiment of the present disclosure.

Referring to FIG. 7 along with FIG. 2, the liquid hydrogen fuel tank 100 may further include a plurality of temperature sensors 120*a*, 120*b*, 120*c* located in a top position of the inner tank 114, a middle position of the inner tank 114, and a lower position of the inner tank 114, respectively. For example, as illustrated in FIG. 7, the plurality of temperature sensors 120*a*, 120*b*, 120*c* may be configured to measure temperature on a surface of a wall of the inner tank 114.

For example, as illustrated in FIG. 7, the first temperature sensor 120*a* may be located at the top position of the inner tank 114. The second temperature sensor 120*b* may be located in the middle position of the inner tank 114. The third temperature sensor 120*c* may be located at the lower position of the inner tank 114. For example, the first temperature sensor 120*a* may be formed near the gaseous hydrogen discharge port 112*b* formed on a top position of the inner tank 114. For example, the second temperature sensor 120*b* may be formed on the outer surface of the inner tank 114 corresponding to a middle position in the vertical direction of the inner tank 114. For example, the third temperature sensor 120*c* may be formed near the liquid hydrogen supply port 112*a* formed at a lower position of the inner tank 114.

Accordingly, the liquid hydrogen fuel tank 100 of the present disclosure further includes the plurality of temperature sensors 120*a*, 120*b*, 120*c* measuring temperatures in the top position of the inner tank 114, the middle position in the height direction of the inner tank 114, and the lower position of the inner tank 114, respectively, thereby measuring a level of liquid hydrogen stored in the liquid hydrogen fuel tank 100 based on temperature values measured from each of the plurality of temperature sensors 120*a*, 120*b*, 120*c* even without using a separate level sensor for measuring the level of liquid hydrogen stored in the inner tank 114. For example, when the liquid hydrogen is stored in the storage space of the inner tank 114 up to a level at which the second temperature sensor 120*b* is located and then the level of the liquid hydrogen is lowered, the temperature measured by the second temperature sensor 120*b* rises, thereby measuring the level of the liquid hydrogen stored in the liquid hydrogen fuel tank 100 using the plurality of temperature sensors 120*a*, 120*b*, 120*c*.

Moreover, since the plurality of temperature sensors 120*a*, 120*b*, 120*c* of the liquid hydrogen fuel tank 100 of the present disclosure can be installed on the outer surface of the inner tank 114, an expensive cryogenic temperature sensor that needs to be installed inside the inner tank 114 is not required. For example, the plurality of temperature sensors 120*a*, 120*b*, 120*c* may be at least one of a thermocouple, a Resistance Temperature Detector (RTD), a thermistor, and an infrared temperature sensor. Preferably, the plurality of temperature sensors 120*a*, 120*b*, 120*c* of the present disclosure may be thermocouples. Accordingly, unlike the conventional technology that uses an expensive sensor such as a silicon diode sensor for measuring temperature of cryogenic materials such as liquid hydrogen, the liquid hydrogen fuel tank 100 of the present disclosure uses a low-cost thermocouple, a RTD, a thermistor, and an infrared temperature sensor, etc., thereby reducing equipment cost of a liquid hydrogen fuel tank 100.

Meanwhile, referring back to FIG. 2, the liquid hydrogen fuel tank 100 of the present disclosure may further include a safety valve 130 provided in the gaseous hydrogen discharge pipe 116. The safety valve 130 may be configured to be opened to reduce internal pressure in case that internal pressure of the gaseous hydrogen discharge pipe 116 exceeds a predetermined pressure. For example, as illustrated in FIG. 2, the safety valve 130 may be formed on one side of the gaseous hydrogen discharge pipe 116.

Accordingly, the liquid hydrogen fuel tank 100 of the present disclosure includes the safety valve 130 integrated with the gaseous hydrogen discharge pipe 116, thereby simplifying structure of the safety valve 130, increasing space efficiency of an installation space where the liquid hydrogen fuel tank 100 is installed, and reducing manufacturing cost of the liquid hydrogen fuel tank 100.

Meanwhile, referring back to FIG. 2 to FIG. 4, the liquid hydrogen fuel tank 100 of the present disclosure may further include a first check valve 141 and a second check valve 142. The first check valve 141 may be provided in the liquid hydrogen supply pipe 118. The first check valve 141 may be configured for a portion of the external charging nozzle 21 to be inserted thereinto. The first check valve 141 may be configured to prevent backflowing from the inner tank 114 toward the outer injection port 118*a* when separating the external charging nozzle 21 from the outer injection port 118*a*. Specifically, the first check valve 141 may be a valve including a ball 141*a* configured to open or close an inlet of the first check valve 141 by the external charging nozzle 21 and a valve including a spring configured to elastically pressurize the ball 141*a* in one direction. However, a configuration for opening or closing the inlet of the first check valve 141 is not necessarily limited to a ball shape, and any shape or structure suitable for opening or closing the inlet can be applied to the first check valve 141. For example, depending on a shape of an inlet of a check valve, a configuration for closing or opening the inlet may be a conical shape, a coin-shape, or a cylindrical shape.

For example, the ball 141*a* of the first check valve 141 is usually configured to seal the inlet by pressure of the spring. In addition, in case that the charging nozzle 21 is inserted into the outer injection port 118*a*, the inserted charging nozzle 21 presses the ball 141*a* in an injection direction and the ball 141*a* moves to be spaced apart from the inlet. Through this process, the first check valve 141 may be closed or opened. The opened first check valve 141 enables injecting of liquid hydrogen from the charging nozzle 21 into the liquid hydrogen supply pipe 118.

The second check valve 142 may be provided in the gaseous hydrogen discharge pipe 116. The second check valve 142 may be configured for the connector 31 of the external gas moving pipe to be inserted thereinto. The second check valve 142 may be configured to prevent liquid hydrogen from backflowing from the inner tank 114 toward the gas discharge port 116*a* when separating the connector 31 from the gas discharge port 116*a*. The second check valve 142 may be a valve including a ball 142*a* configured to open or close an inlet of the second check valve 142 by the external connector 31 and may be a valve including a spring configured to elastically pressurize the ball 142*a* in one direction. However, a configuration for opening or closing the inlet is not necessarily limited to a ball shape, and any shape or structure suitable for opening or closing the inlet can be applied to the second check valve 142. For example, depending on a shape of the inlet of the check valve, a configuration of closing or opening the inlet may be a conical shape, coin-shape, or cylindrical shape.

For example, the ball 142*a* of the second check valve 142 is usually configured to seal the inlet by pressure of the spring. In case that the connector 31 of the external gas moving pipe 30 is inserted into the gas discharge port 116*a*, the connector 31 presses the ball 142*a* and then the second check valve 142 may be opened. The opened second check valve 142 enables gaseous hydrogen in the gaseous hydrogen discharge pipe 116 to be discharged to outside of the gaseous discharge pipe 116 while being injected into the connector 31.

Accordingly, the liquid hydrogen fuel tank 100 of the present disclosure further includes the first check valve 141 and the second check valve 142, thereby performing a liquid hydrogen injection process and a gaseous hydrogen discharge process more smoothly by simply connecting the charging nozzle 21 and the external gas connector 31.

Figure 8:
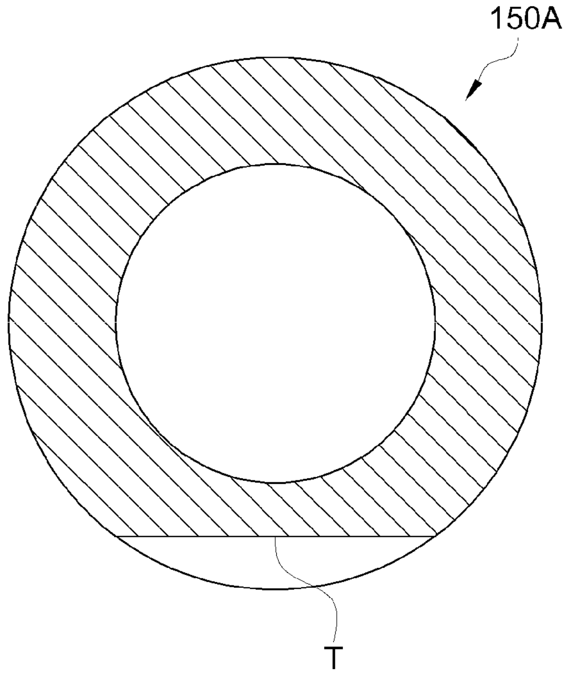
FIG. 8 to FIG. 10 are horizontal cross-sectional views illustrating a support of a liquid hydrogen fuel tank according to an embodiment of the present disclosure.
Figure 9:
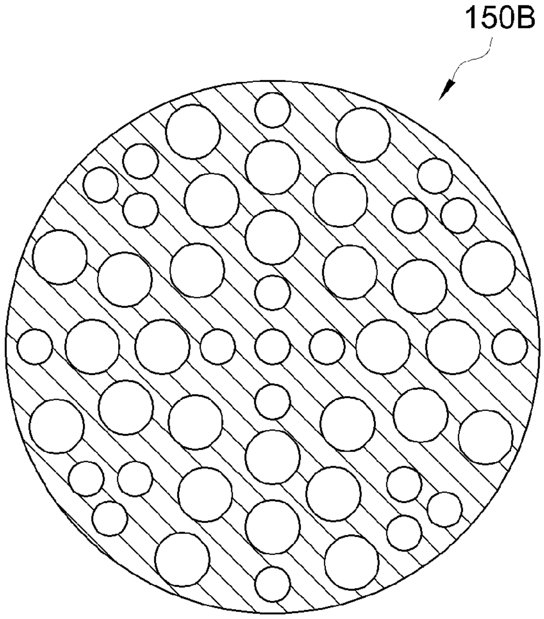
Figure 10:
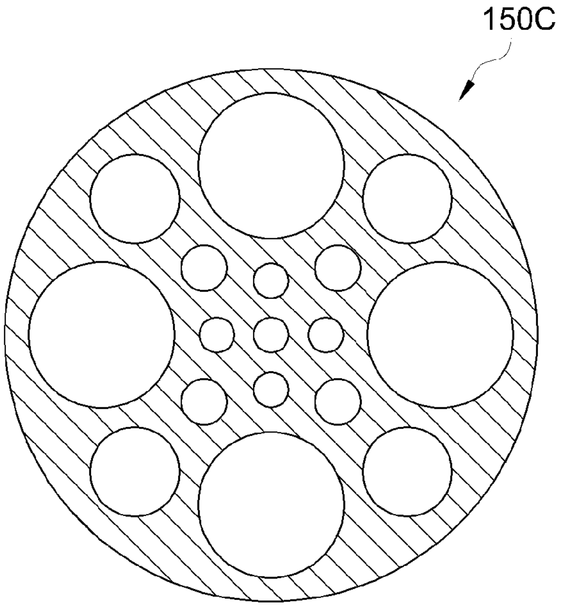

FIG. 8 to FIG. 10 are horizontal cross-sectional views illustrating a support of a liquid hydrogen fuel tank according to an embodiment of the present disclosure.

Referring to FIG. 8 to FIG. 10 along with FIG. 7, the liquid hydrogen fuel tank 100 of the present disclosure may further include a pair of supports 150, 151. Each of one end and the other end of the pair of supports 150, 151 may be configured to be connected to the outer tank 112. At least one side of the pair of supports 150, 151 may be configured to be connected to the inner tank 114.

As illustrated in FIG. 8, a support 150A according to another embodiment may have a structure T in which a center portion of a horizontal section is empty and one side of a circular shape is empty.

As illustrated in FIG. 9, a support 150B according to another embodiment may be formed by radially arranging a plurality of circular holes in a horizontal section.

As illustrated in FIG. 10, a support 150C according to another embodiment may be formed by radially arranging a plurality of circular holes having different diameters in a horizontal section.

Accordingly, the liquid hydrogen fuel tank 100 of the present disclosure further includes the pair of supports 150, 151, which are configured to be connected to the outer surface of the outer tank 112 and partially connected to the inner tank 114 and an inside portion of each of them is partially empty, thereby having an advantage of having a lightweight structure and minimizing heat transfer through an empty space inside. Moreover, the liquid hydrogen fuel tank 100 of the present disclosure can maintain high strength of the inner tank and the outer tank without increasing thickness of the inner tank 114 and the outer tank 112 through the pair of supports 150, 151, thereby increasing durability. Accordingly, the liquid hydrogen fuel tank 100 of the present disclosure has an advantage of being lightweight.

Figure 11:
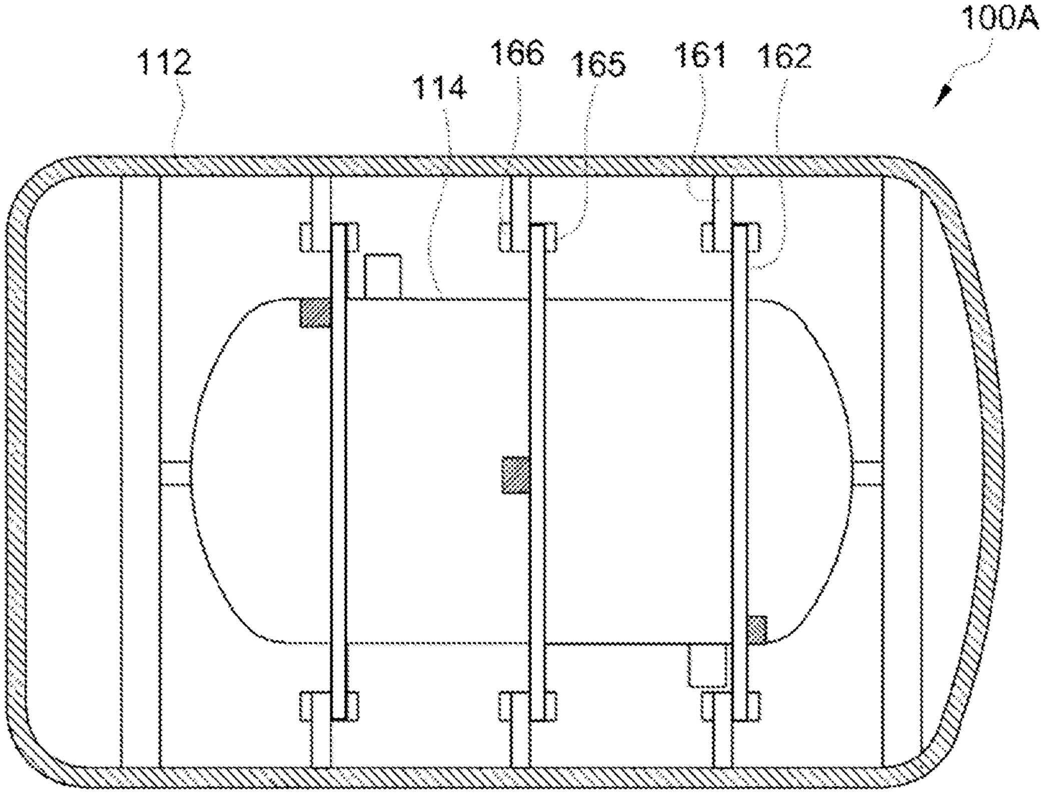
FIG. 11 is a vertical cross-sectional view illustrating an inside of a liquid hydrogen fuel tank according to another embodiment of the present disclosure.
Figure 12:
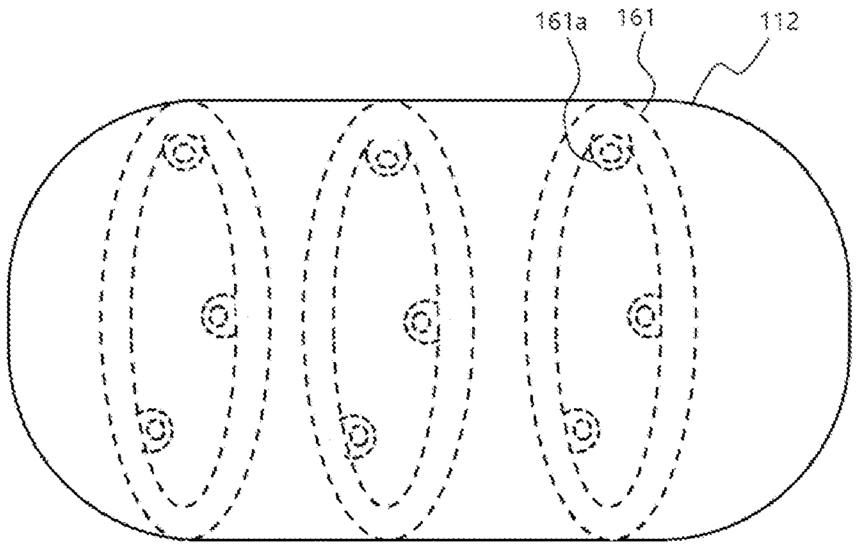
FIG. 12 is a perspective view illustrating an outer tank of the liquid hydrogen fuel tank of FIG. 11.
Figure 13:
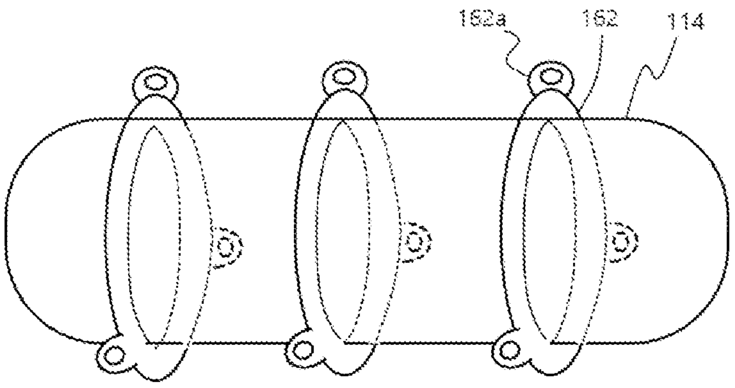
FIG. 13 is a perspective view illustrating an inner tank of the liquid hydrogen fuel tank of FIG. 11.

FIG. 11 is a vertical cross-sectional view illustrating an inside of a liquid hydrogen fuel tank 100A according to another embodiment of the present disclosure. FIG. 12 is a perspective view illustrating an outer tank 112 of the liquid hydrogen fuel tank 100A of FIG. 11. In addition, FIG. 13 is a perspective view illustrating an inner tank 114 of the liquid hydrogen fuel tank 100A of FIG. 11. For reference, FIG. 11 illustrates the inner tank 114 accommodated inside the outer tank 112 of the liquid hydrogen fuel tank 100A.

Referring to FIG. 11 to FIG. 13, the liquid hydrogen fuel tank 100A according to another embodiment of the present disclosure may include a first reinforcing ring 161 and a second reinforcing ring 162. Specifically, the first reinforcing ring 161 may be configured to have an elongated shape along an inner surface of the outer tank 112. The first reinforcing ring 161 may be configured to be supported by the inner surface of the outer tank 112. The second reinforcing ring 162 may be configured to have an elongated shape along an outer surface of the inner tank 114. The second reinforcing ring 162 may be configured to be supported by the outer surface of the inner tank 114. By fastening the first reinforcing ring 161 and the second reinforcing ring 162 to each other, a position of the inner tank 114 accommodated inside the outer tank 112 can be fixed.

Each of the first reinforcing ring 161 and the second reinforcing ring 162 of the liquid hydrogen fuel tank 100A according to another embodiment of the present disclosure may include fastening parts 161*a*, 162*a* configured to be fastened to each other. For example, each of the fastening parts 161*a*, 162*a* may have a hole configured for a fastening bolt 165 to be inserted thereinto. A process of fastening the first reinforcing ring 161 and the second reinforcing ring 162 to each other can be achieved by, for example, inserting the fastening bolt 165 into each hole of the fastening parts 161*a*, 162*a*, and combining a nut 166 with a body of the inserted fastening bolt 165.

However, the fastening bolt 165 is not necessarily limited to these examples, and any fastening means capable of fastening the first reinforcing ring 161 and the second reinforcing ring 162 so as not to move each other is applicable.

Accordingly, the liquid hydrogen fuel tank 100A of the present disclosure includes the first reinforcing ring 161 and the second reinforcing ring 162, and by the first reinforcing ring 161 and the second reinforcing ring 162, it prevents the inner tank 114 from being expanded under internal pressure and prevents the outer tank 112 from being contracted under external pressure. Accordingly, the liquid hydrogen fuel tank 100A of the present disclosure can maintain strength against internal and external pressure of the inner tank 114 and the outer tank 112 through the first reinforcement ring 161 and the second reinforcement ring 162, and the overall thickness of the inner tank 114 and the outer tank 112 can be designed to be thin, thereby reducing weight of the liquid hydrogen fuel tank 100A.

Furthermore, an empty space (hole) is formed inside at least a portion of each of the first reinforcing ring 161 and the second reinforcing ring 162, which can narrow and/or lengthen a heat transfer path of each of the first reinforcing ring 161 and the second reinforcing ring 162, thereby minimizing heat penetration (heat transfer) from the outer tank 112 to the inner tank 114.

For example, the first reinforcing ring 161 and the second reinforcing ring 162 may be configured to minimize heat transfer. For example, each of the first reinforcing ring 161 and the second reinforcing ring 162 may have a pipe shape with an empty inside.

Figure 14:
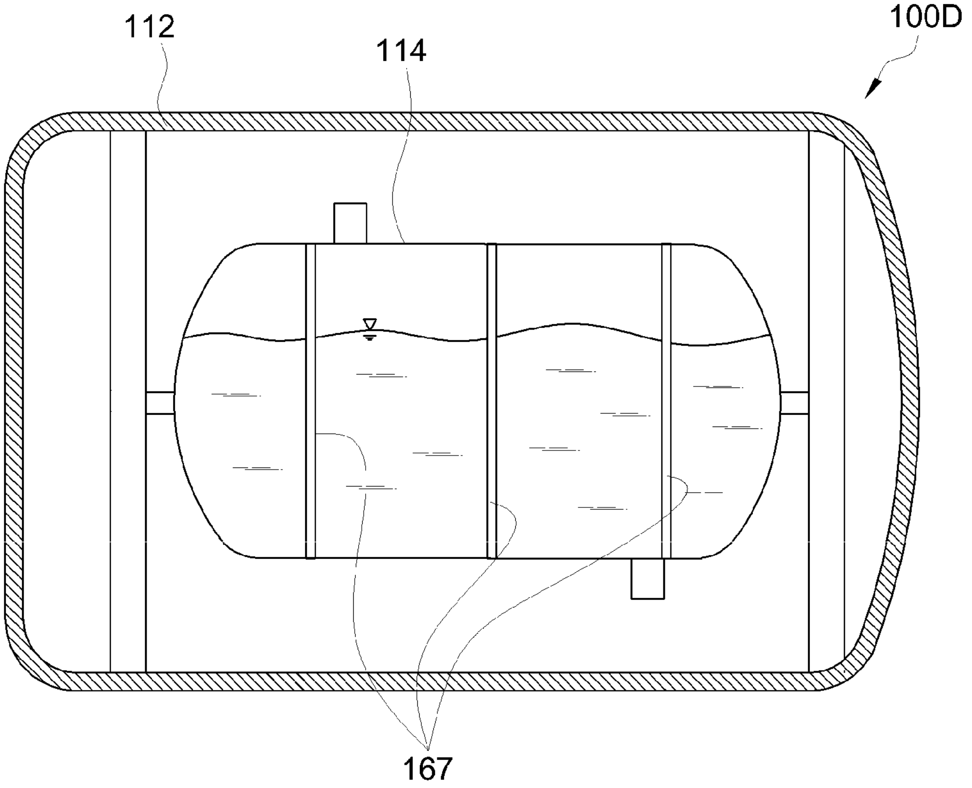
FIG. 14 is a vertical cross-sectional view illustrating an inside of a liquid hydrogen fuel tank according to another embodiment of the present disclosure.

FIG. 14 is a vertical cross-sectional view illustrating an inside of a liquid hydrogen fuel tank 100D according to another embodiment of the present disclosure. In addition, FIG. 15 to FIG. 20 are horizontal cross-sectional views illustrating baffles 167 of a liquid hydrogen fuel tank 100D according to an embodiment of the present disclosure.

Referring to FIG. 14 to FIG. 20, the liquid hydrogen fuel tank 100D according to another embodiment of the present disclosure may be provided with at least one baffle 167 inside the inner tank 114. Each of an upper end and a lower end of the at least one baffle 167 may be configured to support each of an inner ceiling surface and a bottom surface of the inner tank 114. The baffle 167 may have an elongated shape in a vertical direction. The baffle 167 may have a hole (not shown) in which a center of its horizontal cross-section is empty. For example, the upper end of the baffle 167 may be configured to support the ceiling surface of the accommodation space of the inner tank 114. The lower end of the baffle 167 may be configured to support the bottom surface of the accommodation space of the inner tank 114.

Figure 15:
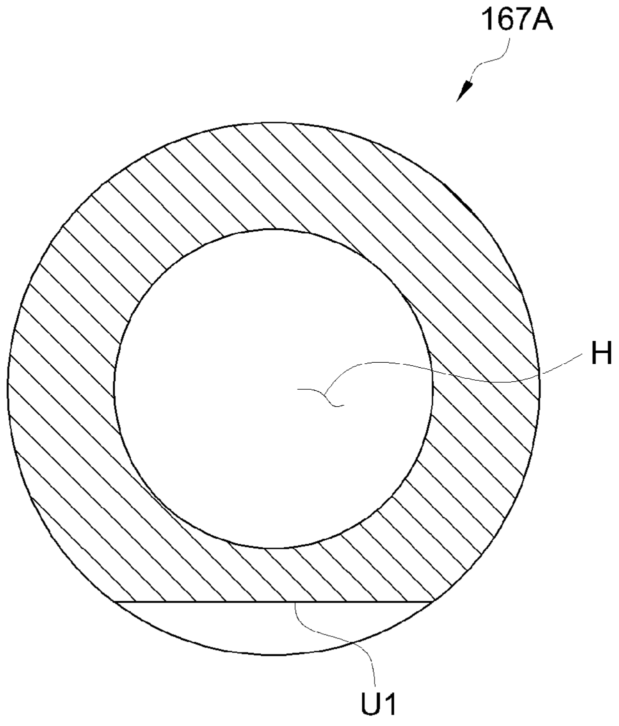
FIG. 15 to FIG. 20 are horizontal cross-sectional views illustrating a baffle of a liquid hydrogen fuel tank according to an embodiment of the present disclosure.

For example, as illustrated in FIG. 15, the baffle 167A according to another embodiment may be formed in a structure U1 having a central hole H and a partially empty inside. The baffle 167A according to another embodiment may have a structure U1 in which one side portion of a circular cross-section is empty.

Figure 16:
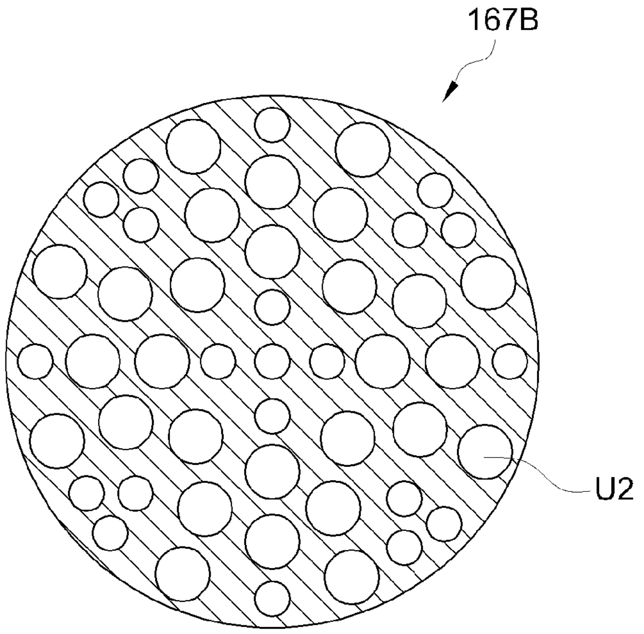

For example, in a baffle 167B according to another embodiment of FIG. 16, a plurality of holes U2 may be formed in a radial arrangement.

Figure 17:
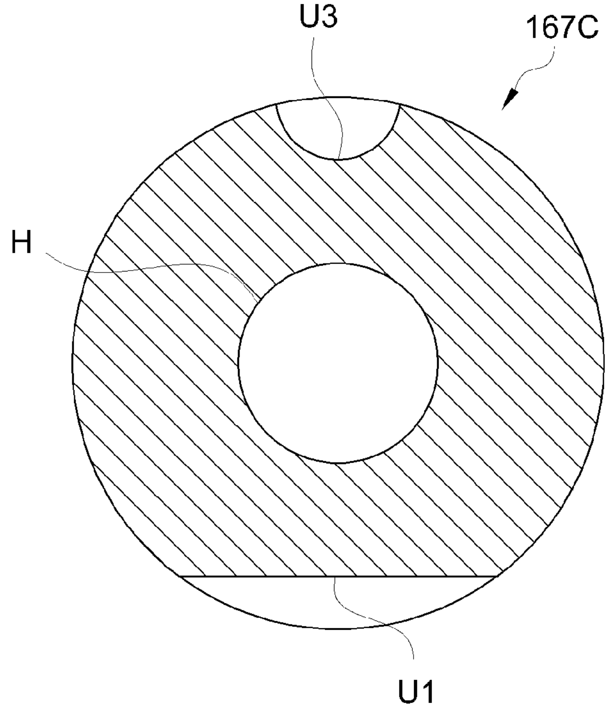

For example, a baffle 167C according to another embodiment of FIG. 17 may have a structure U1 in which one side is empty and a structure U3 in which the other side is empty.

Figure 18:
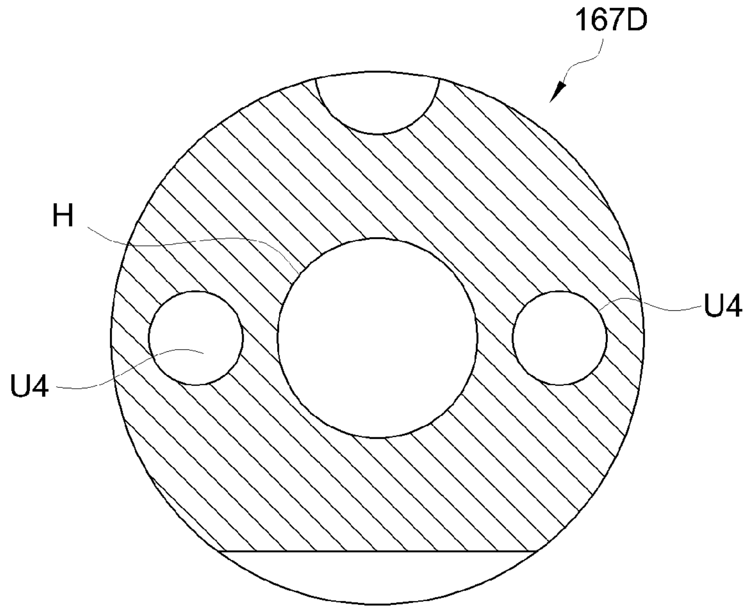

For example, a baffle 167D according to another embodiment of FIG. 18 may have two more holes U4 on each side of the central hole H, compared to the baffle 167C of FIG. 17.

Figure 19:
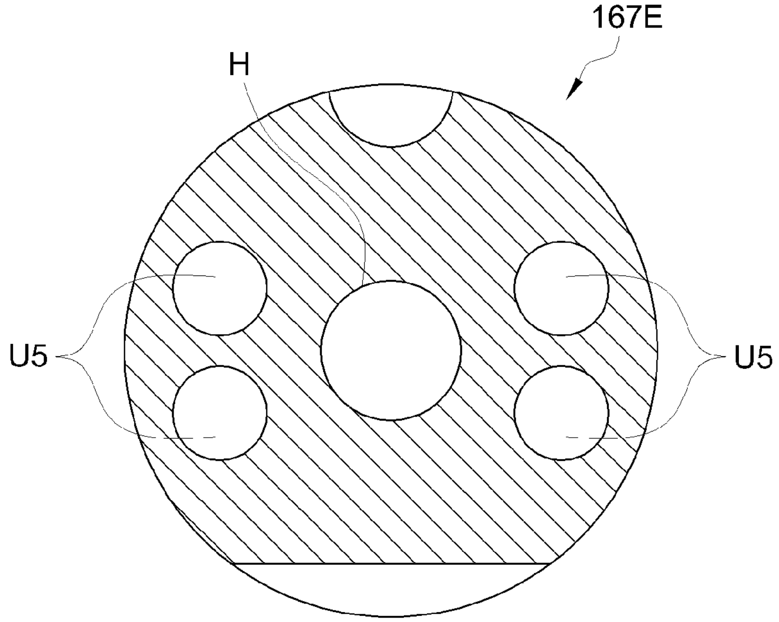

For example, a baffle 167E according to another embodiment of FIG. 19 may further have four holes U5 spaced apart from each other on both sides of a central hole H, compared to the baffle 167C of FIG. 17.

Figure 20:
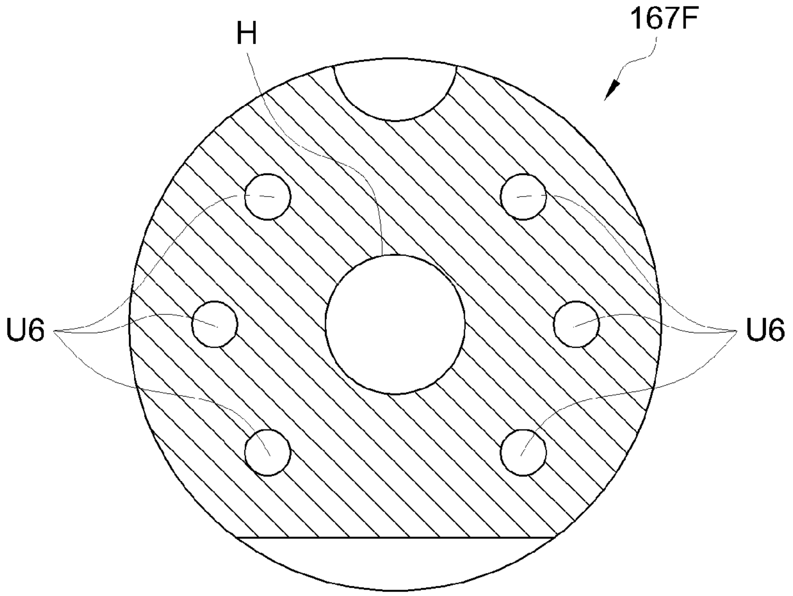

For example, a baffle 167F according to another embodiment of FIG. 20 may have six holes U6 spaced apart from each other on both sides of a central hole H, compared to the baffle 167C of FIG. 17.

Meanwhile, referring back to FIG. 2, in the liquid hydrogen fuel tank 100 according to an embodiment of the present disclosure, a space between the outer tank 112 and the inner tank 114 may be in a negative pressure state within a predetermined range. For example, the space between the outer tank 112 and the inner tank 114 may be a high vacuum. Preferably, the pressure of the space between the outer tank 112 and the inner tank 114 may be 0.001 mbar to 0.00001 mbar. Here, the space between the outer tank 112 and the inner tank 114 can be regarded as a space surrounding the outer surface of the inner tank 114 among accommodation spaces that accommodate the inner tank 114 of the outer tank 112.

The liquid hydrogen fuel tank 100 according to another embodiment of the present disclosure may include an insulation medium (not shown) located in a space between the outer tank 112 and the inner tank 114. The insulating medium may include insulating materials. For example, the insulating medium may have an aerosol or a foam form. For example, the insulating medium may include a multi-layer insulating shielding film.

Accordingly, the liquid hydrogen fuel tank 100 according to an embodiment of the present disclosure further includes the insulation medium located in the space between the outer tank 112 and the inner tank 114, thereby stably maintaining temperature of the inner tank 114 and enabling safe storage of liquid hydrogen.

Meanwhile, referring back to FIG. 2, the injection connection pipe 113 may have a shape spirally extending along the outer surface of the inner tank 114 from the liquid hydrogen supply port 112*a* of the inner tank 114 to the liquid hydrogen supply pipe 118.

Accordingly, the liquid hydrogen fuel tank 100 of the present disclosure includes the spirally extended injection connection pipe 113, so that it can have a curve while increasing a length of the injection connection pipe 113, thereby increasing a heat transfer length of the injection connection pipe 113. Moreover, the spiral injection connection pipe 113 can effectively reduce stress generated when volume shrinkage occurs while being cooled to cryogenic temperature when compared to a straight pipe. That is, in case that a shape of a conventional connection pipe into which liquid hydrogen is injected is a straight pipe with both end portions fixed, a length of the straight pipe contracts when cold liquid hydrogen is injected and thus stress occurs at both end portions of the straight pipe fixed to other configurations. However, in case of a spiral pipe with both end portions fixed, as a length of the spiral pipe shrinks, a spiral diameter of the spiral pipe decreases, which can significantly reduce stress applied to both end portions fixed to other configurations.

Figure 21:
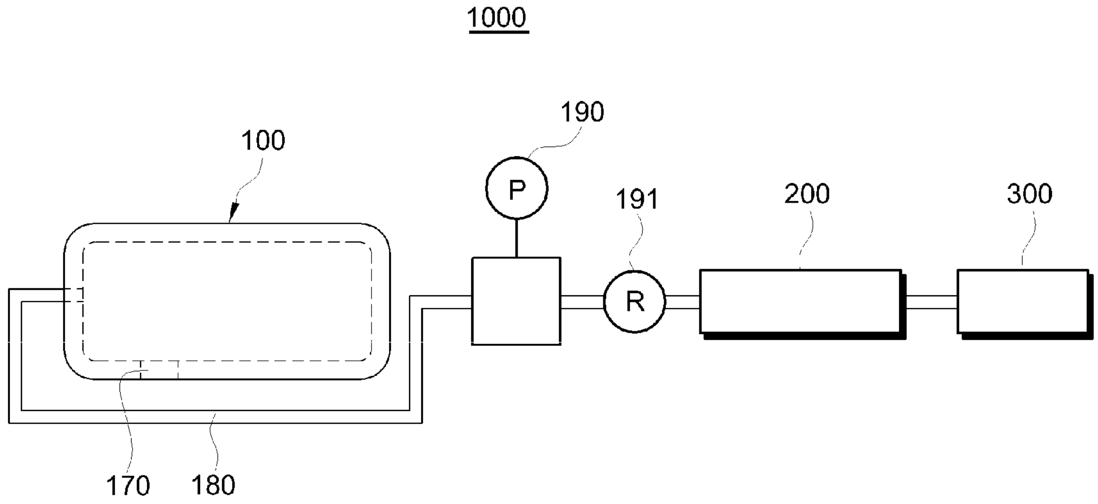
FIG. 21 is a block diagram illustrating a liquid hydrogen storage device according to an embodiment of the present disclosure.

FIG. 21 is a block diagram illustrating a liquid hydrogen storage device 1000 according to an embodiment of the present disclosure.

Referring to FIG. 21 along with FIG. 2, the liquid hydrogen storage device 1000 includes a liquid hydrogen fuel tank 100 of the present disclosure, a gas generating heater 170 located inside the outer tank 112, and a heat exchange pipe 180. The liquid hydrogen storage device 1000 may be configured to generate gaseous hydrogen from liquid hydrogen stored in the liquid hydrogen fuel tank 100 and supply generated gaseous hydrogen to the fuel cell 200. The fuel cell 200 that receives hydrogen may generate power and supply power to an electric motor 300. Specifically, the gas generating heater 170 may be configured to heat the liquid hydrogen fuel tank 100 to evaporate liquid hydrogen contained in the inner tank 114 of the liquid hydrogen fuel tank 100. Evaporated gaseous hydrogen may be moved along the heat exchange pipe 180. The heat exchange pipe 180 may be configured to be connected to the liquid hydrogen fuel tank 100. The heat exchange pipe 180 may be configured to raise temperature of hydrogen gas to an appropriate temperature for fuel supply.

In addition, the liquid hydrogen storage device 1000 of the present disclosure may further include a pressure gauge 190 and a regulator 191 connected to the heat exchange pipe 180. Specifically, the pressure gauge 190 may be configured to indicate air pressure inside the heat exchange pipe 180. The regulator 191 may be configured to adjust air pressure of gaseous hydrogen supplied to the fuel cell.

Although the above has shown and described various embodiments of the present disclosure, the present disclosure is not limited to the specific embodiments described above. The above-described embodiments can be variously modified and implemented by those skilled in the art to which the present invention pertains without departing from the gist of the present disclosure claimed in the appended claims, and these modified embodiments should not be understood separately from the technical spirit or scope of the present disclosure. Therefore, the technical scope of the present disclosure should be defined only by the appended claims.

In the embodiments disclosed herein, arrangement of illustrated components may vary depending on requirements or environment in which the invention is implemented. For example, some components may be omitted or some components may be integrated and implemented as one.

What is claimed is:

1. A liquid hydrogen fuel tank, comprising:

a container including:

an outer tank having a single pipe insertion port into which a pipe is inserted, and an inner tank located inside the outer tank, having a liquid hydrogen supply port into which liquid hydrogen is injected, having a gaseous hydrogen discharge port configured to discharge gaseous hydrogen to the outside, and having a storage space for storing liquid hydrogen;

a gaseous hydrogen discharge pipe configured to allow gaseous hydrogen to flow therein, having an elongated shape extending through the pipe insertion port from inside of the outer tank, and configured to discharge gaseous hydrogen generated in the storage space of the inner tank to the outside and having at least one gas discharge port into which a connector of an external gas moving pipe is insertable;

a liquid hydrogen supply pipe, of which a portion is located inside the gaseous hydrogen discharge pipe, having an elongated shape extending through the pipe insertion port from inside of the outer tank, and having an outer injection port configured to be connected to an external charging nozzle for injecting liquid hydrogen;

a discharge connection pipe, of which one end is connected to the gaseous hydrogen discharge port of the inner tank and the other end is connected to the gaseous hydrogen discharge pipe; and an injection connection pipe, of which one end is connected to the liquid hydrogen supply port and the other end is connected to the liquid hydrogen supply pipe;

wherein the gaseous hydrogen discharge pipe includes at least one gas discharge port configured for a connector of an external gas moving pipe to be inserted thereinto when the external charging nozzle is inserted into the outer injection port of the liquid hydrogen supply pipe;

wherein the gaseous hydrogen discharge pipe is arranged along a same pipe center as the liquid hydrogen supply pipe;

wherein a first check valve is provided in the liquid hydrogen supply pipe to prevent backflow of liquid hydrogen when the external charging nozzle is separated from the outer injection port, and a second check valve is provided in the gaseous hydrogen discharge pipe to prevent backflow of gaseous hydrogen when the connector is separated from the gas discharge port;

wherein temperature sensors are positioned at an upper position, a middle position, and a lower position of the inner tank, respectively, to sense liquid hydrogen level based on temperature change;

wherein a space between the outer tank and the inner tank is in a vacuum state or includes an insulating medium;

wherein the injection connection pipe spirally extends along the outer surface of the inner tank from the liquid hydrogen supply port of the inner tank to the liquid hydrogen supply pipe;

and wherein the liquid hydrogen fuel tank further comprises a gas generating heater configured to heat liquid hydrogen inside the inner tank to evaporate it, and a heat exchange pipe configured to raise temperature of the hydrogen gas generated by evaporation for external supply.

2. The liquid hydrogen fuel tank according to claim 1, further comprising:

a safety valve provided in the gaseous hydrogen discharge pipe.

3. The liquid hydrogen fuel tank according to claim 1, further comprising:

a pair of supports, each having opposite ends respectively connected to the outer tank, and having at least one portion connected to the inner tank.

4. The liquid hydrogen fuel tank according to claim 1, further comprising:

a first reinforcing ring having an elongated shape along an inner surface of the outer tank and having one end configured to be supported by the inner surface of the outer tank; and a second reinforcing ring having an elongated shape along an outer surface of the inner tank and having one end configured to be supported by the outer surface of the inner tank.

5. The liquid hydrogen fuel tank according to claim 1, further comprising:

at least one baffle having an elongated shape in a vertical direction and having an upper end and a lower end respectively supporting each of a ceiling surface and a bottom surface inside the inner tank.

6. The liquid hydrogen fuel tank according to claim 1, wherein a space between the outer tank and the inner tank is in a vacuum state, or an insulating medium is included in the space between the outer tank and the inner tank.

* * * * *